2049X
S. K. Jennings,
Vapor Bath.
Patented Jan. 21, 1814.
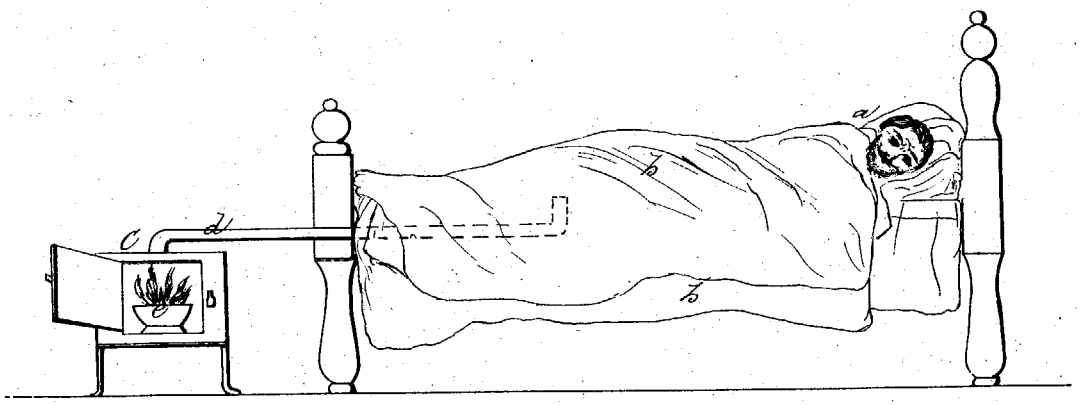
N. PETERS, PHOTO-LITHOGRAPHER, WASHINGTON, D. C.

[illegible] 2049X

Samuel K. Jennings
Letters Patent dated January 21. 1814.

The Schedule referred to in these Letters Patent and making part of the same containing a description in the words of the said Samuel K. Jennings himself of his portable warm and hot Bath.

Is a apparatus which is to be used as a stove and pipe, to convey the heated Gas arising from burning ardent Spirit to the body of a patient sitting in a chair, or lying on a bed couch sofa or cot and covered sufficiently, so as to retain the heat, agreeably to the intended temperature of the Bath; which may be Topical or general.

It may be made of tin, sheet Iron copper or lead or wood &c. A cup of suitable diameter, containing a proper quantity of warmed ardent spirit is placed in the stove the pipe of which is introduced under the bed clothes or covering of the patient. The spirit is then to be set on fire. The Gas ascends as smoke in a Chimney, and is conveyed to its destination by the pipe of the Stove.

Witnesses
Reuben Perry
Jn.o T. Lamb                    Drawing [illegible]

Samuel K. Jennings (228 [illegible])   [illegible] Recorded January [illegible] 1843. [illegible] H.G.C.